United States Patent
Pikus

(10) Patent No.: US 9,729,317 B2
(45) Date of Patent: Aug. 8, 2017

(54) OPTICAL PHYSICAL UNCLONEABLE FUNCTION

(71) Applicant: Mentor Graphics Corporation, Wilsonville, OR (US)

(72) Inventor: Fedor Pikus, Beaverton, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 676 days.

(21) Appl. No.: 14/168,895

(22) Filed: Jan. 30, 2014

(65) Prior Publication Data

US 2015/0215115 A1 Jul. 30, 2015

(51) Int. Cl.
*H04L 29/06* (2006.01)
*H04L 9/08* (2006.01)
*H04L 9/32* (2006.01)

(52) U.S. Cl.
CPC .......... *H04L 9/0852* (2013.01); *H04L 9/0866* (2013.01); *H04L 9/3278* (2013.01)

(58) Field of Classification Search
CPC .... H04L 9/0852; H04L 9/0866; H04L 9/3278
USPC .......................................................... 380/30
See application file for complete search history.

(56) References Cited

U.S. PATENT DOCUMENTS

| | | | | |
|---|---|---|---|---|
| 2003/0204743 A1* | 10/2003 | Devadas | ................ | G06F 21/31 726/9 |
| 2008/0126779 A1* | 5/2008 | Smith | ................... | G06F 21/575 713/2 |
| 2009/0132624 A1* | 5/2009 | Haselsteiner | .......... | G06F 7/588 708/255 |
| 2009/0327747 A1* | 12/2009 | Bruekers | ............ | G07C 9/00087 713/189 |
| 2011/0103161 A1* | 5/2011 | Tuyls | ....................... | G11C 7/04 365/189.16 |
| 2013/0243187 A1* | 9/2013 | Horstmeyer | .............. | H04L 9/28 380/28 |
| 2014/0325644 A1* | 10/2014 | Oberg | ..................... | G06F 21/51 726/22 |
| 2014/0380425 A1* | 12/2014 | Lockett | ................... | H04L 63/20 726/4 |
| 2015/0229482 A1* | 8/2015 | Pinkse | ................... | H04L 9/3278 380/28 |

* cited by examiner

*Primary Examiner* — John B King
(74) *Attorney, Agent, or Firm* — Mentor Graphics Corporation

(57) ABSTRACT

This application discloses a computing system implementing tools and mechanisms that can incorporate an optical physical uncloneable function (PUF) device in a circuit design. The optical physical uncloneable function device can generate at least a portion of a key. The tools and mechanisms can interconnect the optical physical uncloneable function device with a security control device in the circuit design, wherein the security control device is configured to initiate a security action when the key matches an expected key in the security controller.

18 Claims, 6 Drawing Sheets

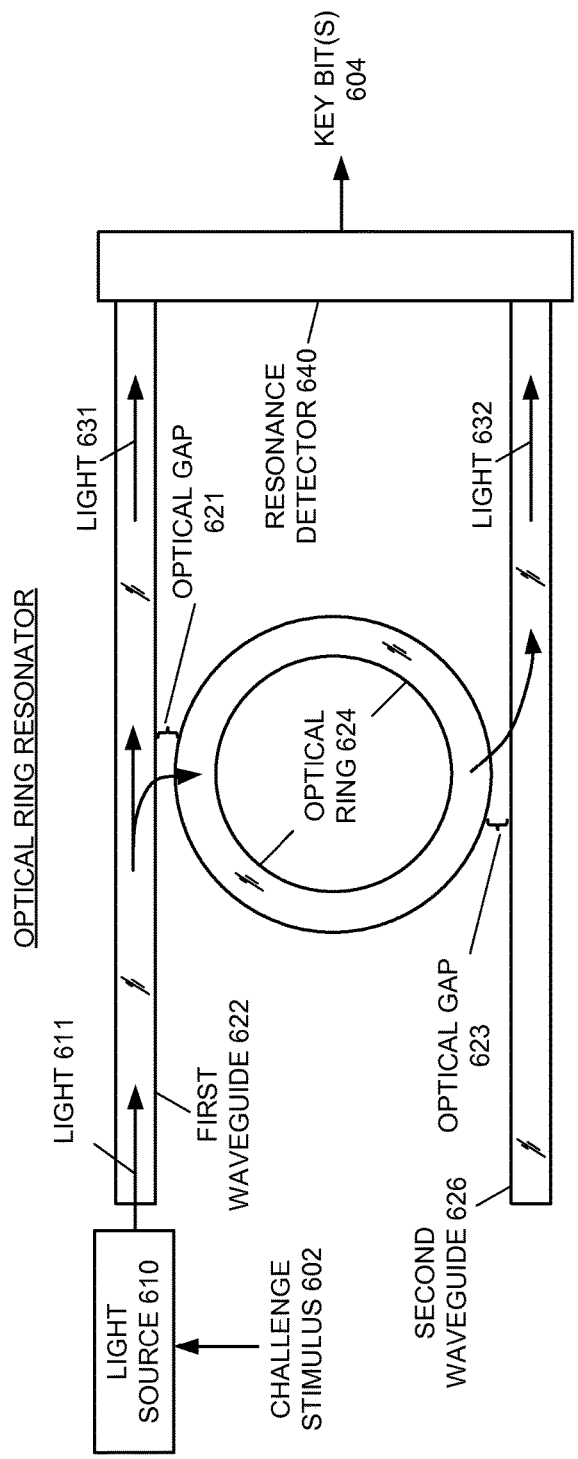
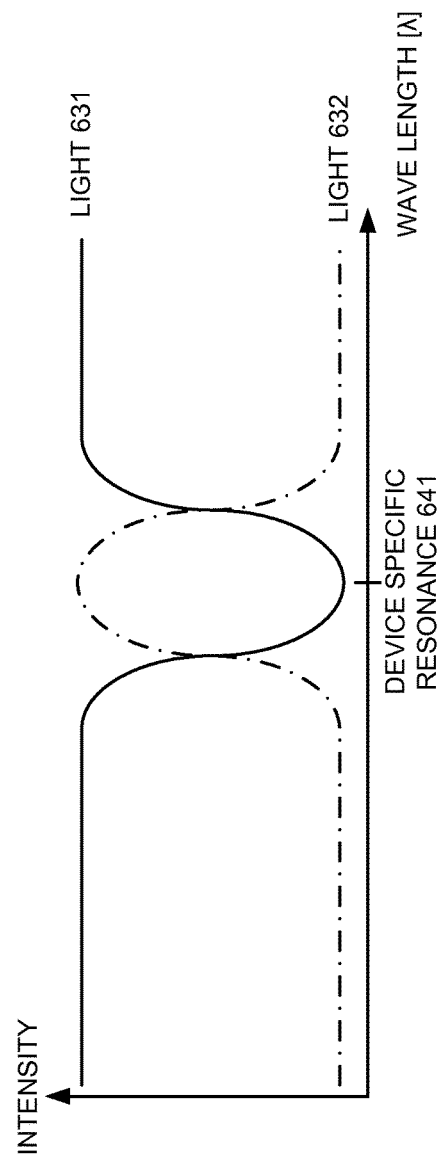
FIG. 6A
FIG. 6B

OPTICAL PHYSICAL UNCLONEABLE FUNCTION

TECHNICAL FIELD

This application is generally related to electronic design automation and, more specifically, to utilizing optical physical uncloneable functions (PUFs) in defense against manufacturing-related vulnerabilities.

BACKGROUND

Many circuit developers utilize third-party fabricators or foundries to manufacture integrated circuit chips or systems implementing their circuit designs. The lack of direct control over the manufacturing of the chips or systems, however, can lead to various manufacturing-related vulnerabilities, such as unauthorized alteration of the circuit designs, unauthorized reuse or dissemination of circuit designs, unauthorized (over)production of chips or systems implementing the circuit designs, or the like. Some circuit developers attempt to combat these manufacturing-related vulnerabilities by maintaining a physical presence, i.e., stationing personnel, at the manufacturing facility, retrieving masks after production, etc. While these attempts can reduce some of the manufacturing-related vulnerabilities, it is often impractical for many circuit developers due cost and cooperation by the fabricators.

In addition to misappropriation of circuit designs or their corresponding manufactured chips or systems, other vulnerabilities, such as distribution channel piracy, exist. For example, third-party distributors can sell cheaper parts mislabeled as premium parts. Since some circuit developers contractually retain distribution rights for their chips or systems, possibly with a requirement to return chips or systems back to the circuit developers before being resold, the unauthorized resale of old chips or systems by third-party distributors, for example, by unsoldering them from a prior system and then reselling them as new or even as an updated model without abiding their contractual obligations.

Some circuit developers have been experimenting with techniques to secure chips or systems implementing the circuit designs from authorized distribution, for example, by including security circuitry capable of locking the chips or systems until they receive a particular key. Since unauthorized knowledge of the particular key can defeat the security circuitry regardless of whether a user was authorized to use an individual chip or system, circuit developers have developed several techniques to have each chip or system implement a circuit design that response to a non-universal key, which preferably can be unique or near-unique. One solution has the chips or systems including a write-once memory capable of population with a unique or near-unique key, which can be accessible by the security circuitry. Since tools, such as electron microscopes, can read content of write-once memories, however, this solution fails to provide key anonymity, allowing copies of the chips or systems to be made with a compromised key.

Another effort to effectuate key anonymity, while retaining a hardware-based security measure, incorporates a physical uncloneable function (PUF) within their security circuitry, which may provide a unique (or near unique) key based on subtle manufacturing variations in the PUF. For example, since cells in a static random-access memory (SRAM) device can each have different initial states, i.e., set to 0 or 1, depending on manufacturing variations in their respective bi-stable latching circuitry, reading the initial value from a set of the cells from the SRAM device can provide a key to security circuitry. Thus, even though the third-party fabricator or foundry utilized the same manufacturing technique to generate multiple chips or systems implementing the same circuit design, each of the multiple chips or systems can have security circuitry that generates a quasi-unique key to unlock the functionality of the chip or system.

Unfortunately, since most PUFs rely on subtle manufacturing variations for their distinctiveness, they are often sensitive to change or alteration based on operating environment, such as temperature, operating voltage or current, etc, or vulnerable to device or feature breakdown over time. Once a PUF has been changed or altered, the PUF outputs a different key, which can cause the security circuitry to erroneously lock the chip or system from operating.

SUMMARY

This application discloses a computing system implementing tools and mechanisms that can incorporate an optical physical uncloneable function (PUF) device in a circuit design. The optical physical uncloneable function device can generate at least a portion of a key. According to various embodiments, the tools and mechanisms can interconnect the optical physical uncloneable function device with a security control device in the circuit design, wherein the security control device is configured to initiate a security action when the key matches an expected key in the security controller.

DESCRIPTION OF THE DRAWINGS

FIGS. 6A and 6B illustrate an example optical ring resonator as an optical physical uncloneable function according to various embodiments of the invention.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
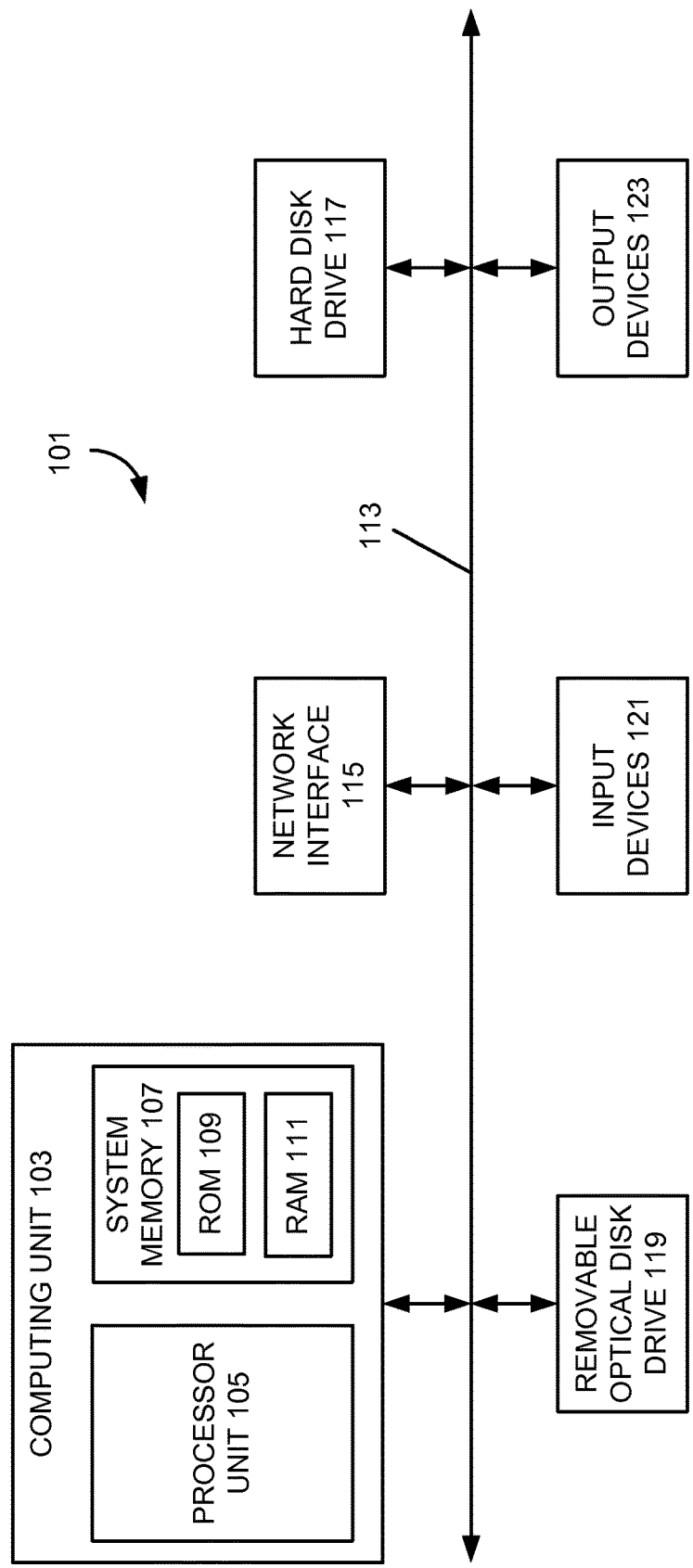
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
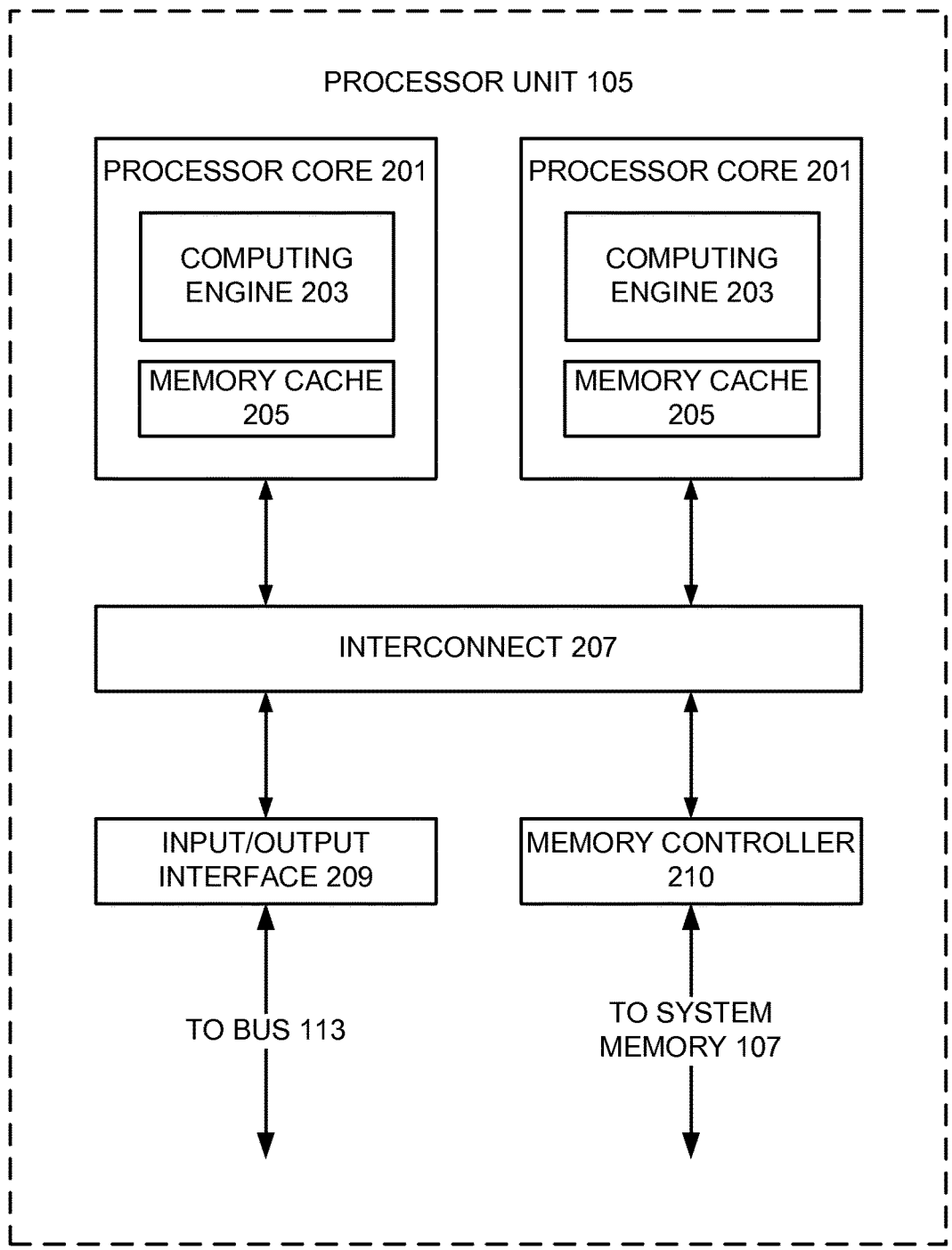

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Optical Physical Uncloneable Function

Figure 3:
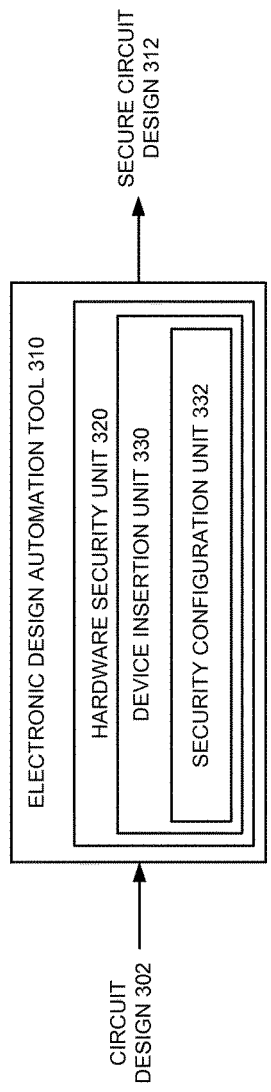
FIG. 3 illustrates an example of an electronic design automation tool to modify a circuit design to incorporate a security device having an optical physical uncloneable function according to various embodiments of the invention.

FIG. 3 illustrates an example of an electronic design automation tool 310 to modify a circuit design to incorporate a security device having an optical physical uncloneable function according to various embodiments of the invention. Referring to FIG. 3, the electronic design automation tool 310 can receive a circuit design 302, which can describe an electronic device at one or more different levels of abstraction. For example, the circuit design 302 can model the electronic device at a register transfer level (RTL), a gate-level, a transistor-level, or the like. At the register transfer level, the circuit design 302 can model the electronic device both in terms of an exchange of data signals between components in the electronic device, such as hardware registers, flip-flops, combinational logic, or the like, and in terms of logical operations that can be performed on the data signals in the electronic device, for example, with code in a hardware description language (HDL), such as Verilog, Very high speed integrated circuit Hardware Design Language (VHDL), SystemC, or the like. At the gate-level, the circuit design 302 can model the electronic device as a network of devices, for example, in a gate-level netlist. At the transistor-level, the circuit design 302 can model the electronic device as a network of transistors, for example, with a Simulation Program with Integrated Circuit Emphasis (SPICE) programming language. Although FIG. 3 shows the electronic design automation tool 310 receiving the circuit design 302, in some embodiments, the electronic design automation tool 310 can develop the circuit design 302 internally.

The electronic design automation tool 310 can include a hardware security unit 320 to modify the circuit design 302 to incorporate hardware-based security features, such as an embedded security device having an array of one or more optical physical uncloneable function devices, and output the modified circuit design as a secure circuit design 312. Electronic devices manufactured according to the secured circuit design 312 can be secured from unauthorized use, as the security device can selectively enable (or lock) operation of at least a portion of the electronic device in response to challenge stimulus. In some embodiments, the security device can implement a challenge-response protocol, for example, providing challenge stimulus to the array of optical physical uncloneable function devices, detecting how the array of optical physical uncloneable function devices respond to the challenge stimulus, and then initiating a security action based on the detected response.

Since each optical physical uncloneable function device can include one or more components having physical characteristics that, when manufactured, randomly fall within a tolerance range for a particular manufacturing process, each chip or system including the array of optical physical uncloneable function devices can be ascribed hardware uniqueness or near uniqueness based on where in the tolerance range the physical characteristics of the components landed during manufacture—even though the chips or systems were manufactured with the same process, utilizing the same secured circuit design 312. Thus, each electronic device manufactured according to the secured circuit design 312 would include a security device to authenticate the electronic device, selectively lock or enable functionality of the electronic device, selectively report the electronic device as authorized or unauthorized, or the like, in response to unique or near unique challenge stimulus.

The hardware security unit 320 can include a device insertion unit 330 to incorporate the security device in the circuit design 302. For example, the device insertion unit 330 can insert the array of one or more optical physical uncloneable function devices and the security controller into the circuit design 302, describe interconnects between the array of one or more optical physical uncloneable function devices and the security controller, and describe a connection between the security controller to the other circuitry in the electronic device, which can allow the security controller to selectively enable the electronic device. In some embodiments, the device insertion unit 330 can modify the circuit design 302 to describe connectivity between the array of optical physical uncloneable function devices and the security controller by establishing at least one new communication route or utilize existing communication infrastructure in the circuit design 302, for example, depending on the level of abstraction in the circuit design 302.

The device insertion unit 330 can include a security configuration unit 332 to configure and locate the security device variously in the circuit design 302, for example, depending on an attack vector identifying assumed sources of the manufacturing-related vulnerabilities. When the attack vector assumes a manufacturing process is trusted, i.e., that the manufacturer will not alter the secure circuit design 312 during fabrication to defeat the hardware-based security features, the security configuration unit 332 can locate the security device to reduce impact of the security device on the electronic device, for example, reducing consumption of chip or system resources, such as power, routing or trace lines, surface area, or the like. When the attack vector assumes a manufacturing process is not trustworthy, the security configuration unit 332 can attempt to conceal the location of the security device in the electronic device and corresponding secure circuit design 312, for example, by distributing components of the security device in the secure circuit design 312, utilizing a variety of different optical physical uncloneable function devices in the security device, reusing existing interconnects to configure the security device, or the like.

Figure 4:
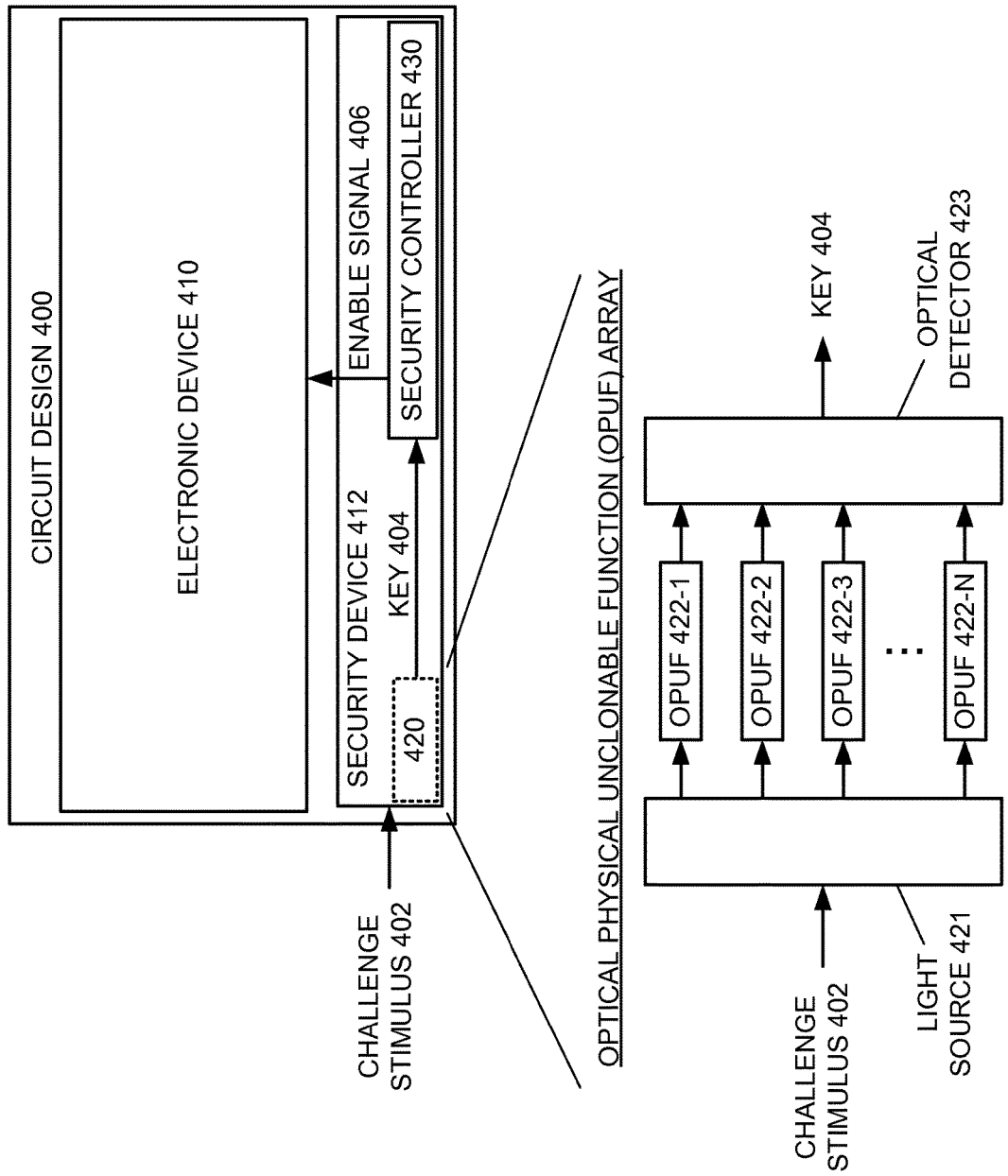
FIG. 4 illustrates an example circuit design including a security device having an optical physical uncloneable function array according to various examples of the invention.

FIG. 4 illustrates an example circuit design 400 including a security device 412 having an optical physical uncloneable function array 420 according to various examples of the invention. Referring to FIG. 4, the circuit design 400 can model an electronic device 410, for example, at one or more of a register transfer level (RTL), a gate-level, a transistor-level, or the like. The circuit design 400 can also include a description of the security device 412, which, in some embodiments, can be incorporated into the circuit design 400 by a hardware security unit in an electronic design automation tool.

The security device 412 can include the optical physical uncloneable function array 420 to generate a key 404 in response to challenge stimulus 402. The security device 412 can be configured to receive the challenge stimulus 402, for example, through pins or other input/output (I/O) described in the circuit design 400, or the security device 412 can internally generate the challenge stimulus 402, for example, in response to other stimulus internal or external to the circuit design 400.

The optical physical uncloneable function array 420 can include at least one light source 421, which can generate light having different characteristics, such as frequency, intensity, phase, or the like, based on the challenge stimulus 402. The light source 421 can provide the light to multiple optical physical uncloneable function devices 422-1 to 422-N in the optical physical uncloneable function array 420. The optical physical uncloneable function devices 422-1 to 422-N can propagate the light towards at least one optical detector 423. Each optical physical uncloneable function device 422-1 to 422-N can propagate or alter light differently depending on internal characteristics of the optical physical uncloneable function devices 422-1 to 422-N and the characteristics of the light. Embodiments of optical physical uncloneable function devices will be described below in greater detail.

The optical detector 423 can detect how the optical physical uncloneable function devices 422-1 to 422-N propagated or altered the light and then generate the key 404 based on this detection. The security device 412 can include a security controller 430 to selectively enable operations of the electronic device 410, authenticate the electronic device 410, prompt reporting of an authorization or failed authorization to a third-party, based, at least in part, on the key 404. In some embodiments, the security controller 430 can generate an enable signal 406 that, when received by the electronic device 410, can selectively enable operations of the electronic device 410. For example, the security controller 410 can compare the key 404 to a security value stored by the security controller 410, and determine a value for the enable signal 406 according to whether the key 404 matches the security value.

Figure 5:
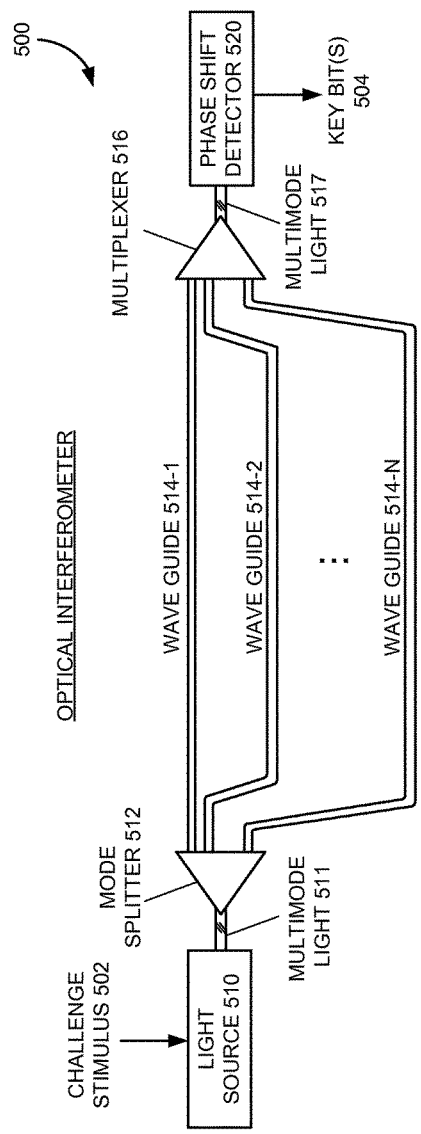
FIG. 5 illustrates an example optical interferometer as an optical physical uncloneable function according to various examples of the invention.

FIG. 5 illustrates an example optical interferometer 500 as an optical physical uncloneable function according to various examples of the invention. Referring to FIG. 5, the optical interferometer 500 can generate at least one key bit 504, in many cases, multiple key bits, in response to challenge stimulus 502. The key bit 504, in some embodiments, can be utilized in combination with other key bits from different optical physical uncloneable function devices to implement hardware-based security features. The optical interferometer 500 can be an optical device, a silicon photonic circuit, or other device capable of superimposing waves, such as electromagnetic, light, or the like.

The optical interferometer 500 can include a light source 510 to generate a light beam or multimode light 511 with characteristics, such as frequency, intensity, directionality, that can vary depending on challenge stimulus 502. The optical interferometer 500 can include a mode splitter 512 to split the multimode light 511 for selective distribution to one or more of the multiple wave guides 514-1 to 514-N. The mode splitter 512 can select which of the wave guides 514-1 to 514-N to provide the multimode light 511 based on the characteristics of the multimode light 511, such as frequency, intensity, directionality, or the like. For example, the mode splitter 512 may be configured to always provide the multimode light 511 to the wave guide 514-1 and select at least one of wave guides 514-2 to 514-N to also receive the multimode light 511 based on the characteristics of the multimode light 511.

Each of the wave guides 514-1 to 514-N can be manufactured from an optically transmissive material capable of propagating light beams received from the mode splitter 512. The wave guides 514-1 to 514-N, when manufactured, may have slight dimensional variations, such as length or width, which can vary a propagation delay of light beams through the wave guides 514-1 to 514-N. This manufacturing variability can provide a uniqueness or quasi-uniqueness to the optical interferometer 500 among other optical interferometers manufactured with the same manufacturing process and the same circuit design. Unlike many conventional physical uncloneable functions, the uniqueness or quasi-uniqueness to the optical interferometer 500 remains through a wide range of operational environments, such as temperature variation, operating voltage, or the like.

The optical interferometer 500 can include a multiplexer 516 to superimpose light beams received from a plurality of the wave guides 514-1 to 514-N to form multimode light 517. For example, when the mode splitter 512 provides light to wave guide 514-1 and wave guide 514-2 based on the characteristics of the light, the beam multiplexer 516 can superimpose the light received from the wave guides 514-1 and 514-2.

The optical interferometer 500 can include a phase shift detector 520 to receive the multimode light 517 from the multiplexer 516, and detect a relative optical delay between the wave guides associated with the multimode light 517. Since a relative optical delay between the wave guides offsets the phase of a common light beam, the phase shift detector 520 can determine a phase shift in the combined light 517 and then identify the relative optical delay between the wave guides associated with the multimode light 517 based on the determined phase shift. Since the relative optical delay identified by the phase shift detector 520 can vary based on which wave guides 514-1 to 514-N received the multimode light 511 and random manufacturing variations of those wave guides, the phase shift detector 520 can generate at least one key bit 504 that is unique or near unique for a given challenge stimulus among devices manufactured with the same process and same circuit design.

FIGS. 6A and 6B illustrate an example optical ring resonator 600 as an optical physical uncloneable function according to various embodiments of the invention. Referring to FIGS. 6A and 6B, the optical ring resonator 600 can generate at least one key bit 604 in response to challenge stimulus 602. The key bit 604, in some embodiments, can be utilized in combination with other key bits from different optical physical uncloneable function devices to implement hardware-based security features. The optical ring resonator 600 can be an optical device, a silicon photonic circuit, or other device capable of propagating light via different optical paths based on light characteristics.

The optical ring resonator 600 can include a light source 610 to generate light 611 with characteristics, such as frequency, intensity, directionality, that can vary depending on challenge stimulus 602. The optical ring resonator 600 can include a first wave guide 622 and a second wave guide 626 located on either side of an optical ring 624. Each of the wave guides 622 and 626 and the optical ring 624 can be manufactured from an optically transmissive material capable of propagating light beams generated by the light source 610. The optical ring resonator 600, when manufactured, may have slight dimensional variations, such as magnitudes of optical gaps 621 and/or 623 located between the optical ring 624 and wave guides 622 and 626, respectively, which can vary a route the light 611 takes to a resonance detector 640. This manufacturing variability can provide a uniqueness or quasi-uniqueness to the optical ring resonator 600 among other optical ring resonator 600 manufactured with the same manufacturing process and the same circuit design. Unlike many conventional physical uncloneable functions, the optical ring resonator 600 remains stable through a wide range of operational environments, such as temperature variation, operating voltage, or the like.

This configuration of the optical ring resonator 600 can provide two different optical paths for the light 611 to propagate towards the resonance detector 640. In the first optical path, the light 611 enters the first wave guide 622 and propagates towards the resonance detector 640 as light 631. In the second optical path, the light 611 enters the first wave guide 622 similar to the first optical path, but due to resonance associated with the optical ring 624 and the frequency of the light 611, which can vary based on a circumference of the optical ring 624 and the magnitude of the optical gaps 621 and 623, the light 611 can exit the first wave guide 622 to traverse the optical ring 624 and enter the second wave guide 626. After entering the second wave guide 626, the light 611 can propagate towards the resonance detector 640 as light 632.

The resonance detector 640 can detect light 631 and 632 from the first and second optical paths, respectively, in the optical ring resonator 600 and generate a key bit 604 based on intensities of the detected light 631 and 632. The optical ring resonator 600 can have a device-specific resonance 641, i.e., a specific wavelength or frequency, at which collimated light 611 traverses the second optical path at or over a threshold level. Due to the manufacturing viabilities for the optical ring resonator 600, for example, variations in magnitudes of the optical gaps 621 and 623, the device-specific resonance 641 can shift randomly between devices manufactured with the same process from the same circuit design. Thus, each manufactured optical ring resonator 600 can propagate light 632 through the second optical path by prompting the light source 610 to generate the light 611 with at a particular frequency that can be unique or nearly unique for each manufactured optical ring resonator 600.

Figure 7:
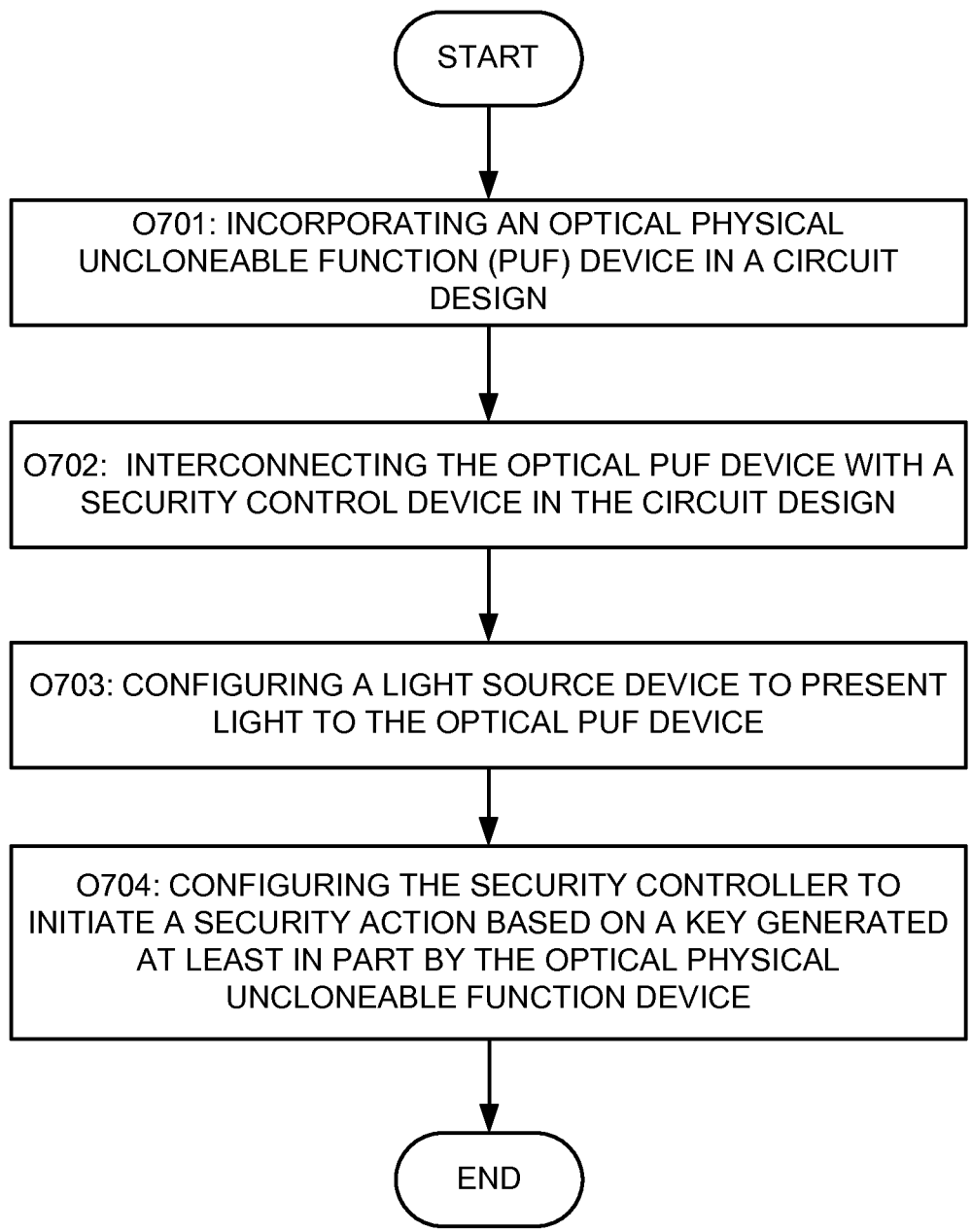
FIG. 7 illustrates an example flowchart implementing inclusion of an optical physical uncloneable function in a circuit design according to various embodiments of the invention.

FIG. 7 illustrates an example flowchart implementing inclusion of an optical physical uncloneable function in a circuit design according to various embodiments of the invention. Referring to FIG. 7, in a block 701, an electronic design automation tool can incorporate an optical physical uncloneable function (PUF) device in a circuit design. In some embodiments, the electronic design automation tool can insert an array of optical physical uncloneable function devices into the circuit design. The optical physical uncloneable function can include an optical interferometer, an optical ring resonator, or other optical circuitry capable of implementing a physical uncloneable function.

In a block 702, the electronic design automation tool can interconnect the optical PUF device with a security control device in the circuit design. The electronic design automation tool can describe interconnects between one or more optical physical uncloneable function devices and the security controller. In some embodiments, the electronic design automation tool can modify the circuit design to describe connectivity between the optical physical uncloneable function devices and the security controller by establishing at least one new communication route or utilize existing communication infrastructure in the circuit design, for example, depending on the level of abstraction in the circuit design.

In a block 703, the electronic design automation tool can configure a light source device to present light to the optical PUF device, for example, based on challenge stimulus. Since each optical PUF can respond differently to variations in at least one light characteristic, the electronic design automation tool can correlate challenge stimulus to the variations in the at least one light characteristic. For example, in an optical ring resonator, since a variation in the wavelength of light generated by the light source, alters the optical path through the optical ring resonator, the electronic design automation tool can configure the light source to alter the wavelength of generated light based on the challenge stimulus.

In a block 704, the electronic design automation tool can configure the security controller to initiate a security action based on a key generated by the optical PUF. The security controller can compare a key generated by the optical PUF in response to the light from the light source to an expected key, and generate the secure action when the key deviates from the expected key. In some embodiments, upon an initial start-up of the optical PUF and any other associated circuitry utilized to generate a key, the security controller can receive a first instance of the key, which it may utilize as an expected key for subsequent authentication or authorization events.

The security action can include at least one of determining an authentication of the electronic device described by the circuit design, prompting the electronic device to annunciate the results of the authentication, selectively securing circuitry in the circuit design, selectively reporting the electronic device as authorized or not authorized, or the like. In some embodiments, the electronic design automation tool can connect the security controller to the circuitry in the circuit design, for example, generating an interconnect for the security controller to provide an enable signal to the circuitry in the circuit design.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   generating, by an optical physical uncloneable function (PUF) device in an electronic device, at least a portion of a key in response to received light, wherein the optical physical uncloneable function device includes multiple wave guides, each of the wave guides to propagate the light in a different predetermined optical path defined prior to manufacture of the electronic device, and wherein the at least the portion of the key has a value corresponding to which of the optical paths the light traversed based, at least in part, on optical characteristics of the optical physical uncloneable function device set during the manufacture of the electronic device;
   receiving, by a security controller, at least the portion of the key from the optical physical uncloneable function device interconnected with the security controller in the electronic device; and
   initiating, by the security controller a security action through the interconnection when the key matches an expected key in the security controller.

2. The method of claim 1, wherein the optical physical uncloneable function device includes one or more silicon photonic circuits.

3. The method of claim 2, wherein the one or more silicon photonic circuits includes an optical interferometer or an optical ring resonator.

4. The method of claim 1, wherein optical characteristics of the wave guides in the optical physical uncloneable function device are set during manufacture and randomly fall within a tolerance range for a particular manufacturing process of the wave guides.

5. The method of claim 1, wherein the security action includes at least one of selectively enabling circuitry in the electronic device, determining an authenticity of the electronic device, prompting the electronic device to annunciate the authenticity of the electronic device, or selectively reporting the electronic device as authorized or unauthorized.

6. The method of claim 1, further comprising configuring the security controller to compare the key with the expected key.

7. The method of claim 1, further comprising configuring the security controller to utilize the key, generated at least in part by optical physical uncloneable function device during an initial start-up of the electronic device, as the expected key.

8. The method of claim 1, wherein the optical physical uncloneable function device further comprises an optical detector configured to generate the at least the portion of the key based on the light propagated through the wave guides.

9. The method of claim 8, wherein the optical physical uncloneable function device further comprises a mode splitting device configured to select one or more of the wave guides to propagate the light based on one or more characteristics of the light, wherein the optical detector is configured to generate the at least the portion of the key based on phase differences in the light propagated through the wave guides.

10. The method of claim 8, wherein at least one of the wave guides includes an optical ring configured to select one or more of the wave guides to propagate the light based on one or more characteristics of the light, wherein the optical detector is configured to generate the at least the portion of the key based on the light propagated through the wave guides.

11. An optical physical uncloneable function device comprising:
    a light source device configured to receive challenge stimulus and generate light based, at least in part, on the challenge stimulus;
    multiple wave guides, each of the wave guides to propagate the light in a different predetermined optical path based on characteristics of the light from the light source device, wherein the different predetermined optical paths are defined prior to manufacture of the optical physical uncloneable function device; and
    an optical detector to receive light propagated through the wave guides and, in response to received light, to generate at least a portion of a key having a value corresponding to which of the optical paths the light traversed, wherein a security controller is configured to initiate a security action when the key matches an expected key in the security controller.

12. The optical physical uncloneable function device of claim 11, wherein the optical physical uncloneable function device comprises one or more silicon photonic circuits.

13. The optical physical uncloneable function device of claim 12, wherein the one or more silicon photonic circuits includes an optical interferometer or an optical ring resonator.

14. The optical physical uncloneable function device of claim 11, wherein optical characteristics of the wave guides in the optical physical uncloneable function device are set during manufacture and randomly fall within a tolerance range for a particular manufacturing process of the wave guides.

15. The optical physical uncloneable function device of claim 11, wherein the security action includes at least one of selectively enabling circuitry in an electronic device including the optical physical uncloneable function device, determining an authenticity of the electronic device, prompting the electronic device to annunciate the authenticity of the electronic device, or selectively reporting the electronic device as authorized or unauthorized.

16. The optical physical uncloneable function device of claim 11, further comprising a mode splitting device configured to select one or more of the wave guides to propagate the light based on one or more characteristics of the light, wherein the optical detector is configured to generate the at least the portion of the key based on phase differences in the light propagated through the wave guides.

17. The optical physical uncloneable function device of claim 11, wherein at least one of the wave guides includes an optical ring configured to select one or more of the wave guides to propagate the light based on one or more characteristics of the light, wherein the optical detector is configured to generate the at least the portion of the key based on the light propagated through the wave guides.

18. The optical physical uncloneable function device of claim 11, further comprising configuring the security controller to utilize the key, generated at least in part by optical physical uncloneable function device during an initial startup of the electronic device, as the expected key.

* * * * *